(12) United States Patent
Purgatorio et al.

(10) Patent No.: US 8,251,327 B2
(45) Date of Patent: Aug. 28, 2012

(54) ADJUSTABLE CONTAINER HOLDER AND METHOD

(75) Inventors: James C. Purgatorio, Woodridge, IL (US); Henry T. Ewald, Roselle, IL (US); Paul G. Simmons, Glen Ellyn, IL (US); David W. Kirby, Lemont, IL (US); Peter Rivera-Pierola, Chicago, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 0 days.

(21) Appl. No.: 12/799,054

(22) Filed: Apr. 16, 2010

(65) Prior Publication Data

US 2011/0253867 A1   Oct. 20, 2011

(51) Int. Cl.
*A47F 5/00* (2006.01)
(52) U.S. Cl. ............... 248/298.1; 211/51; 248/316.8
(58) Field of Classification Search ............ 211/51, 211/1, 59.3; 248/298.1, 316.3, 316.8, 316.1, 248/316.6; 221/310, 221, 304
See application file for complete search history.

(56) References Cited

U.S. PATENT DOCUMENTS

| | | | |
|---|---|---|---|
| 2,896,820 A | 7/1959 | Clark et al. | |
| 3,095,996 A | 7/1963 | Babin | |
| 4,234,101 A | 11/1980 | Pastore | |
| 4,307,835 A | 12/1981 | Roccaforte | |
| 4,319,696 A * | 3/1982 | Stevens | 221/310 |
| 4,441,618 A | 4/1984 | Mancini | |
| 5,027,957 A | 7/1991 | Skalski | |
| 5,060,807 A | 10/1991 | Beagle | |
| 5,582,326 A | 12/1996 | Nishimura | |
| 5,697,521 A | 12/1997 | Dixon | |
| 5,941,415 A | 8/1999 | Roethel | |
| 6,427,868 B1 | 8/2002 | Vine | |
| 6,515,590 B1 | 2/2003 | Lauria | |
| 6,779,770 B2 * | 8/2004 | Kaupp | 248/311.2 |
| 7,293,663 B2 | 11/2007 | Lavery, Jr. | |
| 7,325,701 B1 | 2/2008 | Meyer et al. | |
| 7,588,225 B2 * | 9/2009 | Wawerski | 248/311.2 |

OTHER PUBLICATIONS

International Searching Authority, International Search Report and Written Opinion, International Application No. PCT/US2011/000673, Jul. 5, 2011.

* cited by examiner

*Primary Examiner* — Ramon Ramirez
(74) *Attorney, Agent, or Firm* — Ryndak & Suri LLP

(57) ABSTRACT

A container holder adapted to hold a container between two spaced apart prongs is provided herein. The prongs clamp the container with a clamping force large enough to hold the container, but small enough to avoid damaging the container. The prongs may be spaced apart to fit different-sized containers, while the clamping force still meets these criteria. The clamping force may be provided by a substantially constant-force spring or a variable-force spring. In a method according to the present invention, a stack of nested containers is held in a container holder as described, for subsequent removal of a selected container from the stack.

26 Claims, 6 Drawing Sheets

ADJUSTABLE CONTAINER HOLDER AND METHOD

FIELD OF THE INVENTION

The present invention relates to container holders and methods of holding containers to permit removal of selected containers. More particularly, the invention relates to an adjustable container holder for alternately holding nested stacks of containers of various sizes.

BACKGROUND OF THE INVENTION

In the high-volume restaurant industry, containing food items is a significant part of providing food to customers. Typically, food is served in disposable containers for customers to carry away from the restaurant. To provide the most efficient service, it is essential for kitchen employees to have consistent, quick and easy access to these food containers. Thus, container holders adapted to be retained in a fixed position and to hold a plurality of food containers are frequently employed. Currently, multiple container holders are typically used in the same setting to accommodate food containers having various standard sizes corresponding to various types of food items. This results in wasted time and/or space for food preparation. For example, at breakfast time, when biscuits and croissants are more popular than hamburgers, hamburger container holders may take up space that would be better used for biscuit or croissant holders. Alternatively, an employee may have to take the time to move the hamburger holders and replace them with more biscuit or croissant holders. Either way, existing container holders place a burden on efficient customer service.

A need therefore exists for a container holder adapted to hold a plurality of containers for consistent, quick and easy removal of selected containers, without taking up excessive space or requiring excessive set-up time.

BRIEF SUMMARY OF THE INVENTION

In accordance with one aspect of the present invention, an adjustable container holder is provided. The container holder includes a support and two generally parallel spaced apart prongs mounted to the support for movement relative to each other. At least one of the prongs is movable relative to the support to adjust the spacing between the prongs while maintaining the generally opposed orientation of the prongs. The other prong may be movable or fixed relative to the support as desired. A spring operatively connected to at least one of the prongs is configured to provide a force to urge that prong towards the other prong and to cause the prongs to exert a clamping force when a container is located between the prongs to hold the container between the prongs. The prongs may additionally each include a detent at their ends to prevent removal of boxes not intentionally selected for removal. If desired, the prongs may extend generally horizontally from the support so that the container holder may conveniently hang on a wall or other fixed vertical structure. The spacing between the prongs may be generally horizontal.

Preferably, the clamping force is large enough to retain a plurality of nested corrugated paperboard clamshell single-serving sandwich containers, and small enough to avoid damaging or undesirably deforming the containers when the spacing between the prongs is from about 2.5 inches to about 6 inches, a range that encompasses the widths of a substantial variety of typical fast-food clamshell sandwich boxes. The present inventors have found that clamping forces between about 0.1 pound and about 1.5 pounds is preferable.

In one embodiment, the spring is a substantially constant force spring. For example, the spring may be a flat spiral spring. In another embodiment, the spring is a variable-force spring that is preloaded to nonetheless provide a substantially constant force over the range of movement of the prongs relative to each other. In both of the foregoing embodiments, the clamping force is substantially constant over a full range of spacing between the prongs permitted by the movement relative to the support of at least the first prong.

In still another embodiment, the spring is a variable-force spring providing a variable clamping force, but the clamping force remains within the useful range wherein the clamping force is adequate to grip but not damage a container.

When the container holder is combined with a plurality of nested containers held between its prongs, a container dispenser is formed, from which a desired number of containers may be selectively removed for use.

In another aspect of the present invention, a method of holding a container for subsequent removal is provided. According to the method, a container holder as generally described above is provided. The prongs of the holder are moved apart from each other to a sufficient spacing to permit a container to be located between the prongs, and a container is located between the prongs. For example, the container may be a typical fast-food clamshell sandwich box having a hinge. The prongs are released to permit the spring force to urge the prongs closer to each other and to clamp the container between the prongs. Releasing the prongs preferably results in a clamping force from about 0.1 to about 1.5 pounds being applied to the container. If the container is a clamshell box, it may be clamped at the ends of its hinge.

In one embodiment of the method, a stack of nested containers is located between the prongs. A selected container may then be removed from the holder by gripping the selected container and sliding it toward the free ends of the prongs to separate the selected container from an adjacent nested container in the stack. The clamping force of the prongs, and the detents, if they are included, help to prevent the adjacent nested container from clinging to the selected container. The selected container is then removed by pulling it past the free ends of the prongs.

DETAILED DESCRIPTION OF THE INVENTION

Container holders adapted to hold a plurality of different-sized containers are described in this section. With reference to the Figures generally, container holders are described which are adapted to provide a clamping force that is sufficient to grip typical fast-food sandwich clamshell boxes having a range of different sizes but insufficient to damage or undesirably deform the boxes. According to one embodiment illustrated in FIGS. 1-8, a container holder 10 incorporating a substantially constant-force flat spiral spring 12 is described. According to an alternative embodiment, an alternative spring mechanism incorporating a variable-force spring 12' is also described in this section, with reference to FIG. 9.

Referring generally to FIGS. 1-8, the structure of container holder 10 incorporating a substantially constant-force flat spiral spring 12 is described in the following paragraphs.

Figure 1:
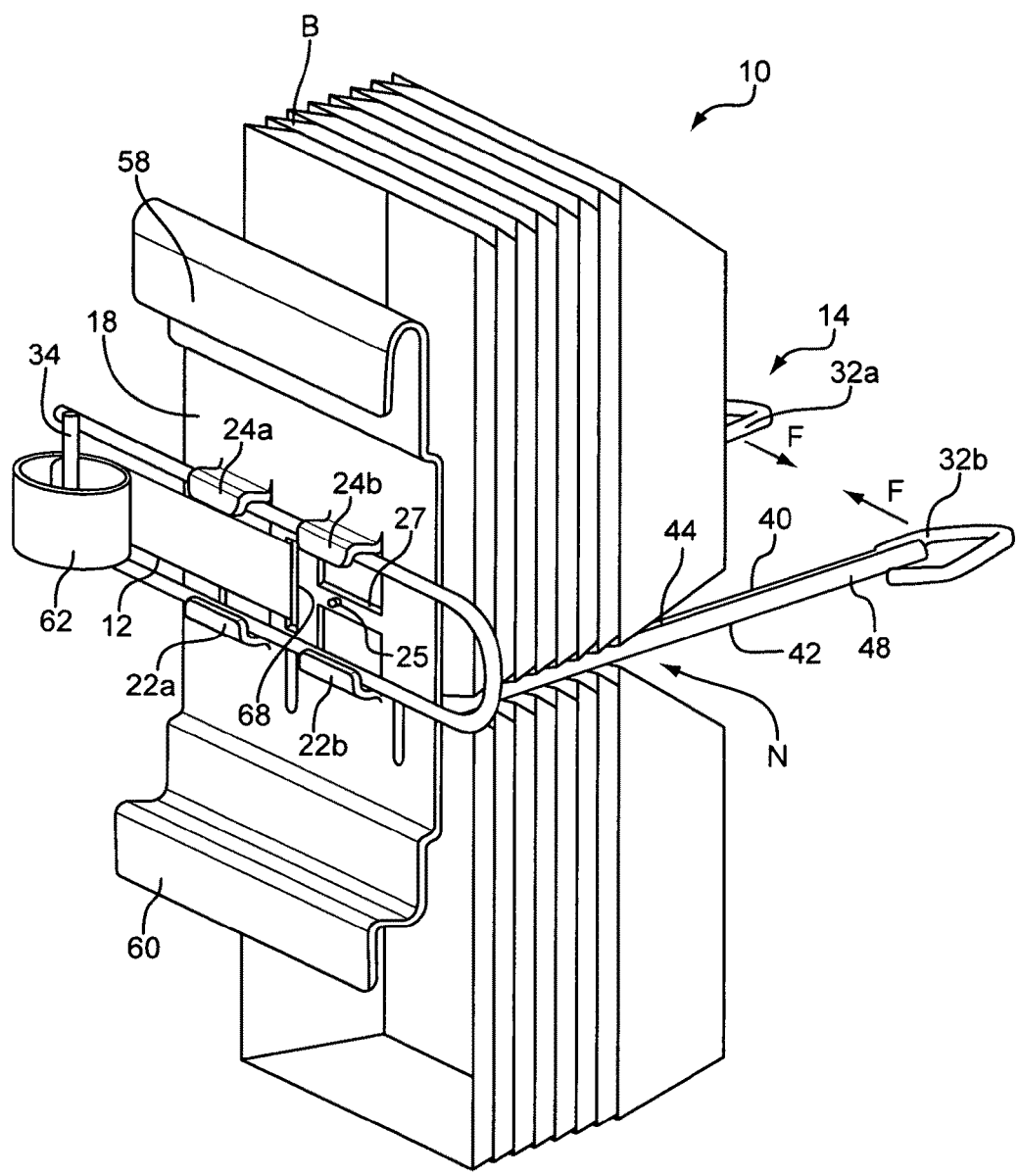
FIG. 1 is a rear-left perspective view of a container holder according to the invention holding typical fast-food clamshell sandwich boxes.
Figure 4:
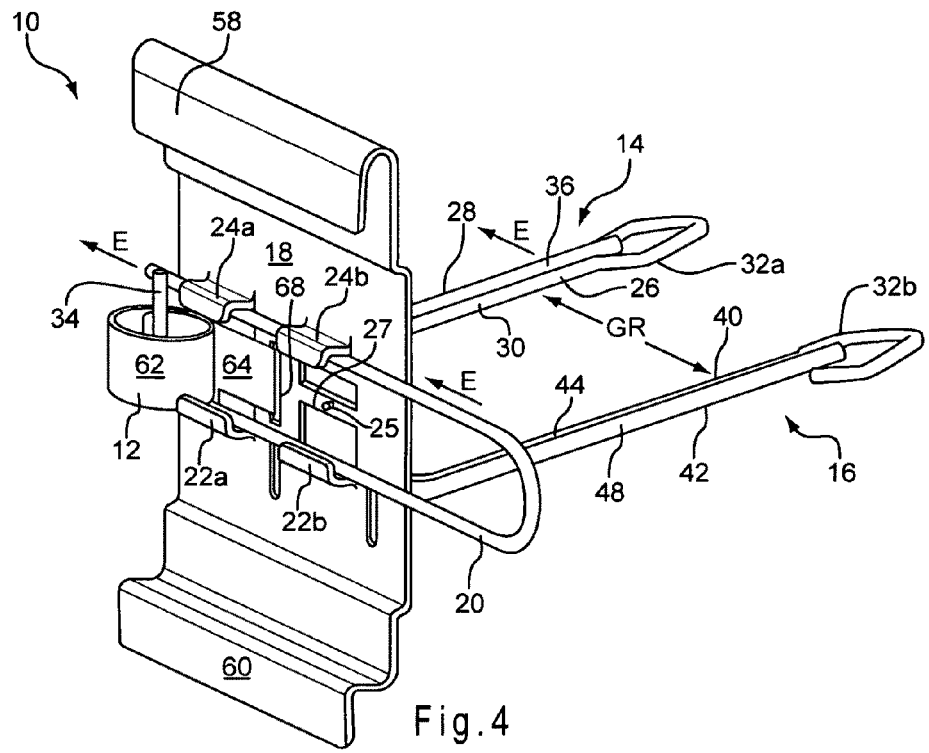
FIG. 4 is a rear-left perspective view of a container holder according to the invention illustrating the fully retracted configuration thereof.
Figure 5:
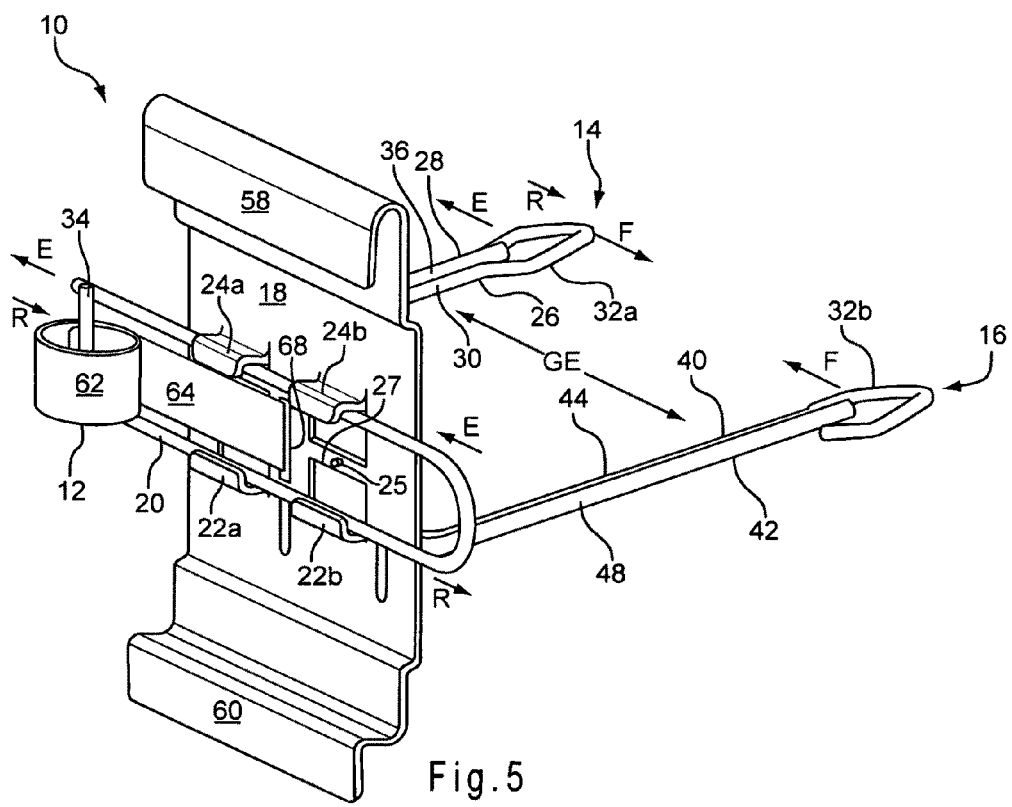
FIG. 5 is a rear-left perspective view of a container holder according to the invention illustrating a partially extended configuration thereof.
Figure 6:
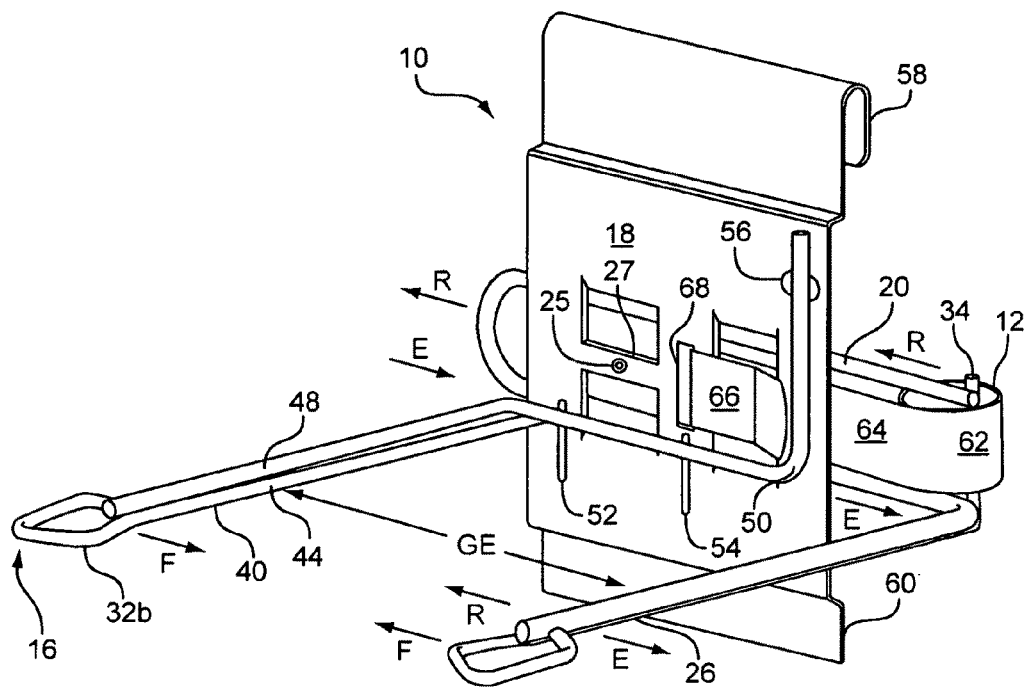
FIG. 6 is a front-right perspective view of a container holder according to the invention illustrating a partially extended configuration thereof.
Figure 7:
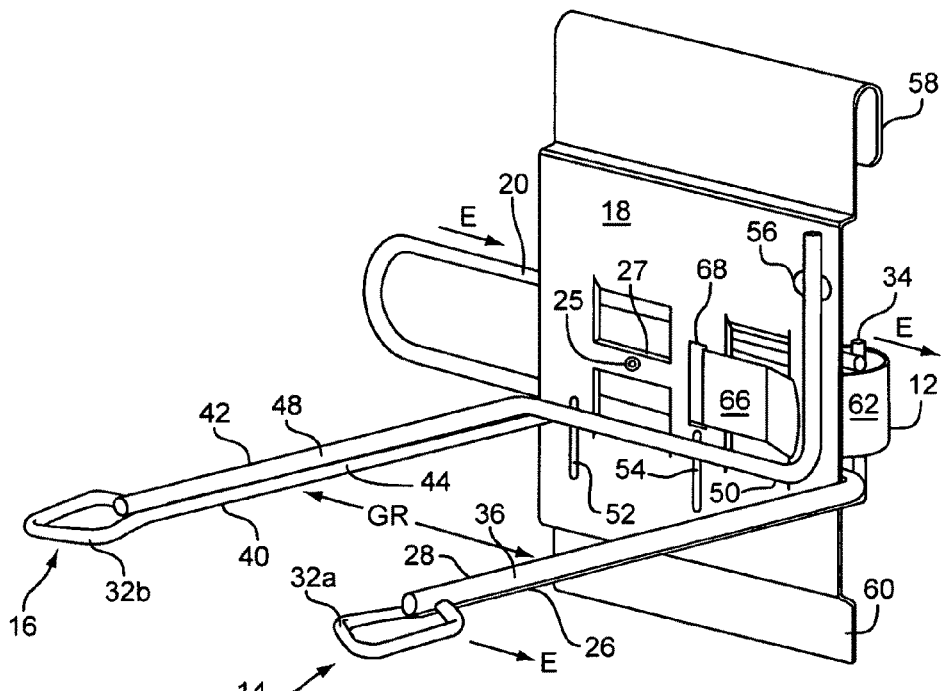
FIG. 7 is a front-right perspective view of a container holder according to the invention illustrating a fully retracted configuration thereof.
Figure 8:
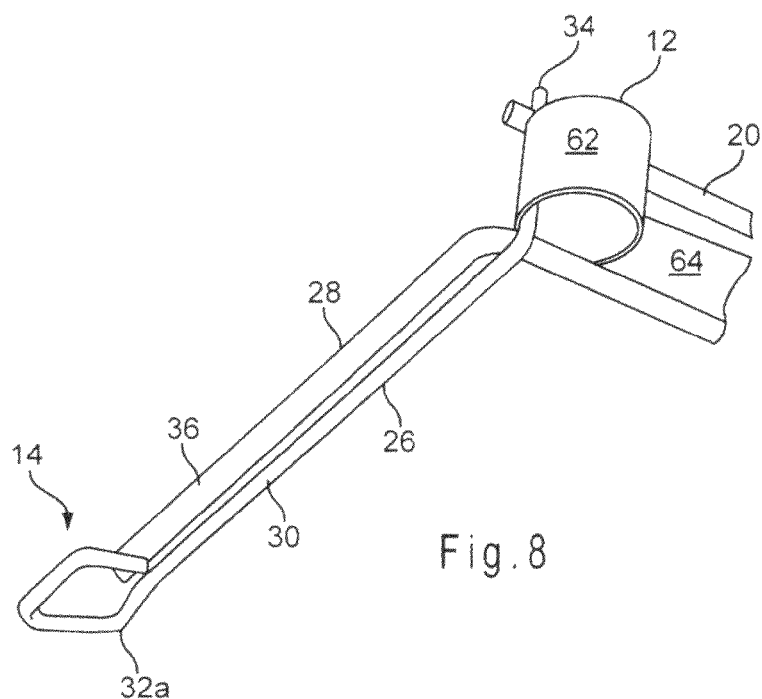
FIG. 8 is a fragmentary rear-right perspective view of a movable prong of a container holder according to the invention, illustrating the manner of attachment of the movable prong to a flat spiral spring.

Container holder 10 includes a pair of generally opposed prongs 14 and 16, where prong 14 is shown as a right prong that is slidingly connected to a back plate 18, and prong 16 is shown as a left prong that is fixedly attached to back plate 18. Turning to FIG. 4, a U-shaped base portion 20 of right prong 14 is slidingly received between lower slide tabs 22a, b and upper slide tabs 24a, b of back plate 18. A protruding portion of a stop member 25, seen in FIGS. 1, 4 and 5, substantially prevents base portion 20 from sliding further in the direction indicated by arrows E when base portion 20 impinges stop member 25, thus preventing base portion 20 from sliding off of back plate 18. Stop member 25 is illustrated as a rivet having a base portion at the front side of a rib 27 of back plate 18, as seen in FIGS. 6 and 7, and extending backwardly therethrough, as seen in FIGS. 1, 4 and 5. Alternatively, stop member 25 could be welded to or formed in rib 27, or otherwise attached to any suitable part of back plate 18 so as to substantially prevent base portion 20 from sliding off of back plate 18. FIG. 8 is a fragmentary illustration of the integral attachment of right prong 14 to sliding base 20, whereby a thinner bent rod 26 is welded to a thicker bent rod 28. Bent rod 26 includes a longitudinal portion 30, a shoulder detent 32a, and a vertical spring post 34. Bent rod 28 includes a longitudinal portion 36 and a transverse U-shaped base portion 20 which, as shown fully in FIG. 4, fits slidingly between slide tabs 22a, b and 24a, b.

The structure of left prong 16 is shown in FIG. 6. Similarly to right prong 14, left prong 16 includes a thinner bent rod 40 welded to a thicker bent rod 42. Bent rod 40 includes a longitudinal portion 44 and a shoulder detent 32b. Bent rod 42 includes a longitudinal portion 48 and a transverse L-shaped base portion 50 which is welded to beads 52, 54 and 56 of back plate 18. In this manner, left prong 16 is fixedly attached to back plate 18.

Back plate 18 itself additionally includes a hanging lip portion 58, adapted for hanging back plate 18 on a suitable fixed vertical structure (not shown), and a stepped foot portion 60, adapted for propping back plate 18 away from the fixed vertical structure, so as to avoid impingement of the structure by flat spiral spring 12 and/or by right prong 14.

With reference to FIGS. 4 and 6, flat spiral spring 12 includes a spiral-coiled portion 62 which winds around spring post 34 of right prong 14, and an uncoiled, generally flat portion 64 which connects by a spring lip 66 to spring receiving slot 68 in back plate 18.

Figure 2:
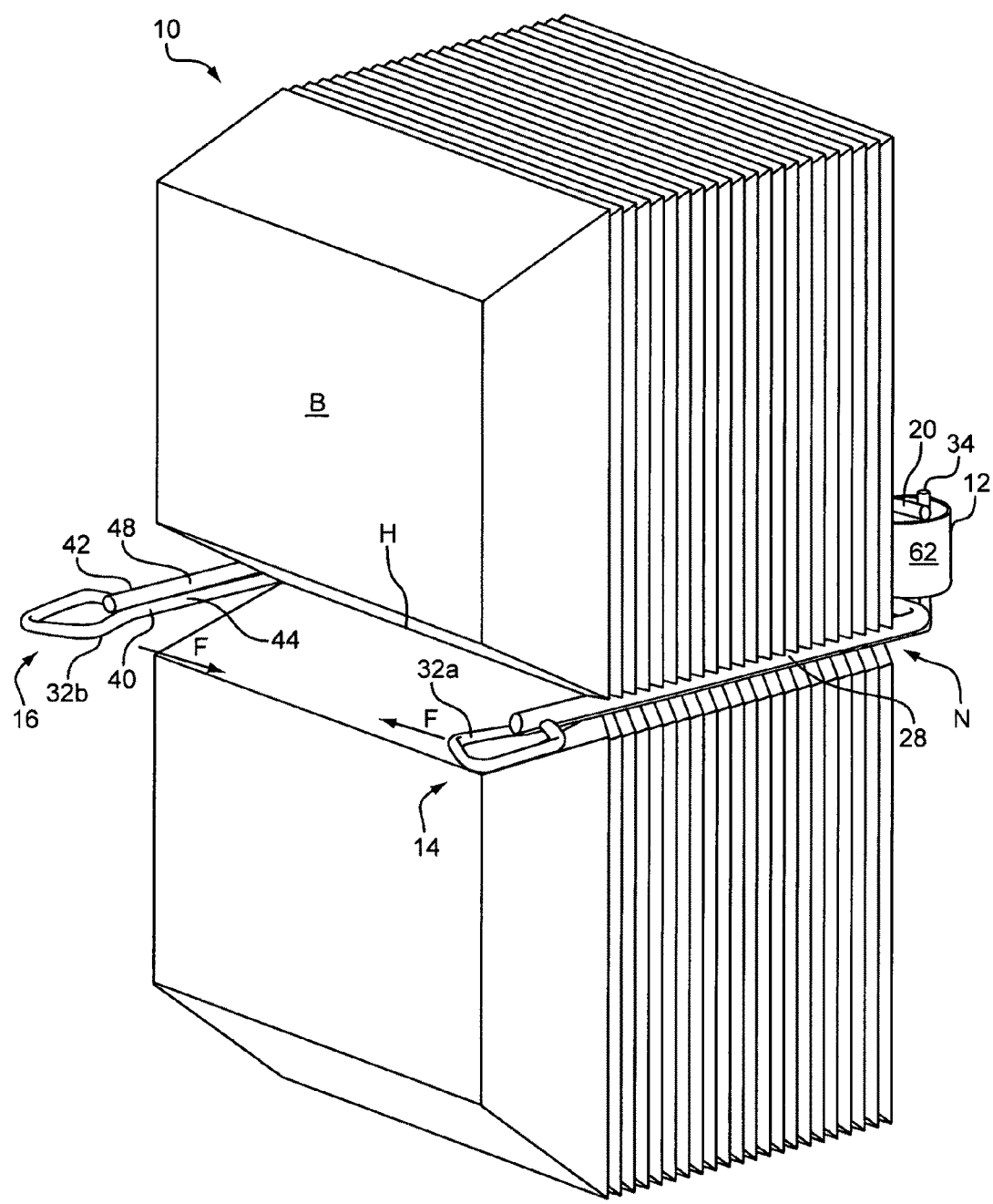
FIG. 2 is a front-right perspective view of a container holder according to the invention holding typical fast-food clamshell sandwich boxes.
Figure 3:
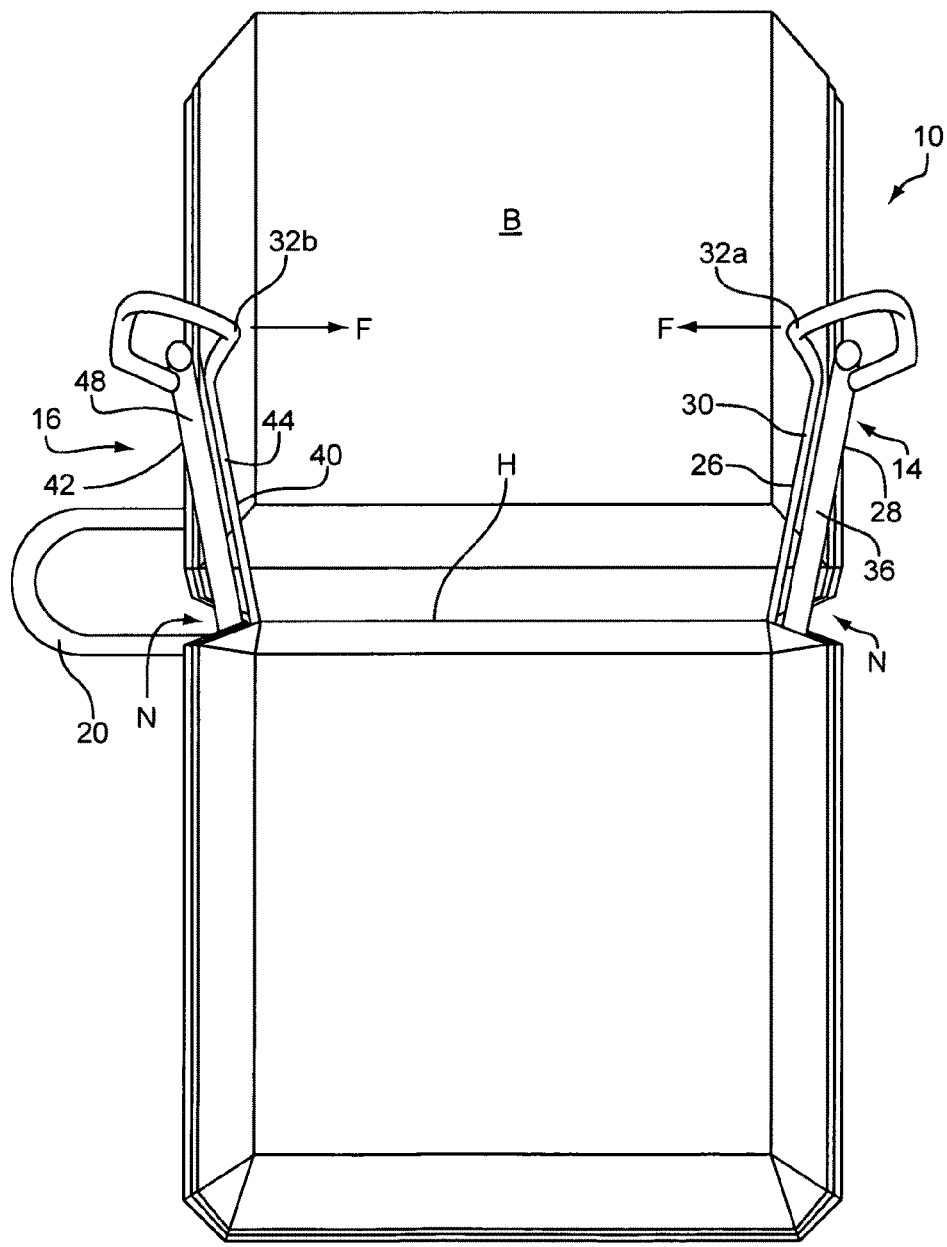
FIG. 3 is a frontal perspective view of a container holder according to the invention holding typical fast-food clamshell sandwich boxes.

The function of container holder 10 will now be described, with reference to FIGS. 1-7. In FIGS. 1-3, container holder 10 is shown holding a stack of nested quick service restaurant clamshell sandwich boxes B. The generally elongate shape of prongs 14 and 16 makes them particularly well suited to be received in notches N typically found at the ends of hinges H of clamshell boxes B. Additionally, the disposition of thinner bent rods 26 and 40 inward and downward relative to thicker bent rods 28 and 42 matches the taper of the upper side of notches N, as best shown in FIG. 3, thus improving the frictional contact between prongs 14 and 16 and notches N by comparison to single-rod prongs. This frictional contact is beneficial, as it restrains or prevents accidental sliding of boxes B toward the ends of prongs 14 and 16, as well as helping to retain the remainder of boxes B in place when a selected box B or plurality of boxes B are intentionally removed from container holder 10. Likewise, the inward curvature of shoulder detents 32a, b is adapted so that they partially obstruct but do not wholly prevent the removal of boxes B, so that intentionally applying a sufficient force will remove boxes B that one desires to remove, but not boxes B that one desires to leave, including lower boxes B that "cling" to upper boxes B in which they are nested, for example.

Boxes B are held between prongs 14 and 16 by a clamping force represented by arrows F in FIGS. 1-3. In the embodiment illustrated in FIGS. 1-8, clamping force F is provided by substantially constant-force flat spiral spring 12. In particular, spring 12 produces a force tending to wind up coiled portion 62 toward generally flat portion 64, thereby pulling spring post 34 inwardly towards spring receiving slot 68.

In the fully retracted configuration of container holder 10 illustrated in FIGS. 4 and 7, the base of right prong 14 is braced against the right edge of back plate 18, as best seen in FIG. 7. In this configuration, there is no net clamping force between prongs 14 and 16, and prong 14 is only free to move away from prong 16 to extend the width of the gap between prongs 14 and 16 in the direction indicated by arrows E. The fully retracted, minimum width of the gap between prongs 14 and 16 is denoted in FIGS. 4 and 7 as $G_R$.

On the other hand, in the extended configuration of container holder 10 illustrated in FIGS. 5 and 6, right prong 14 is pulled away from the edge of back plate 18 and is free to retract in the direction indicated by arrows R as well as to extend further from prong 16 in the direction indicated by arrows E. In the extended configuration, the force of spring 12 results in a clamping force F tending to move prongs 14 and 16 back together towards the retracted configuration. Because spring 12 is a substantially constant-force spring, clamping force F remains substantially the same over a range of extended gap widths $G_E$, one example of which is shown in FIG. 5. Thus, by appropriately selecting and configuring the elements of container holder 10, and particularly the spring force provided by spring 12, prongs 14 and 16 can be made to grip different boxes having a range of sizes firmly enough to retain the boxes, but not so firmly as to damage or undesirably deform the boxes. It should be noted that the maximum permitted gap width $G_E$ will be determined by the configuration of stop member 25, as by preventing further extension movement of base member 20, stop member 25 also prevents further extension movement of prong 14 away from prong 16 when base member 20 impinges stop member 25. Thus, stop member 25 should be configured to impinge base member 20 only when extended gap width $G_E$ is slightly larger than the width of the clamped portion of the largest box desired to be clamped.

Typically, clamping forces of at least about 0.1 lb are satisfactory to grip a typical quick service restaurant clamshell sandwich box B, and that forces no greater than about 1.5 lbs will not damage or undesirably deform a typical clamshell sandwich box B. The inventors have also noted that a container holder 10 with prongs 14 and 16 that may be adjusted to a range of gap widths of from about 2.5 inches to about 6.0 inches will accommodate a substantial variety of typical fast-food clamshell sandwich boxes B. Thus, container holder 10 typically provides a clamping force F between prongs 14 and 16 that remains within the range of from about 0.1 pound to about 1.5 pounds over a range of gap widths between prongs 14 and 16 of from about 2.5 inches to about 6.0 inches.

However, it should be noted that, although the illustrated container holder 10 is shown as used for holding boxes B, holders and methods of using holders for gripping any items of varying size firmly enough to hold the items, without gripping them too firmly, are included in the present invention. To accommodate such other items, appropriate adjustments may be made to the useful range of gap widths and the optimal range of clamping forces, as well as to the shape of prongs 14 and 16 or other suitable gripping members, without departing from the essential scope and spirit of the invention.

Figure 9:
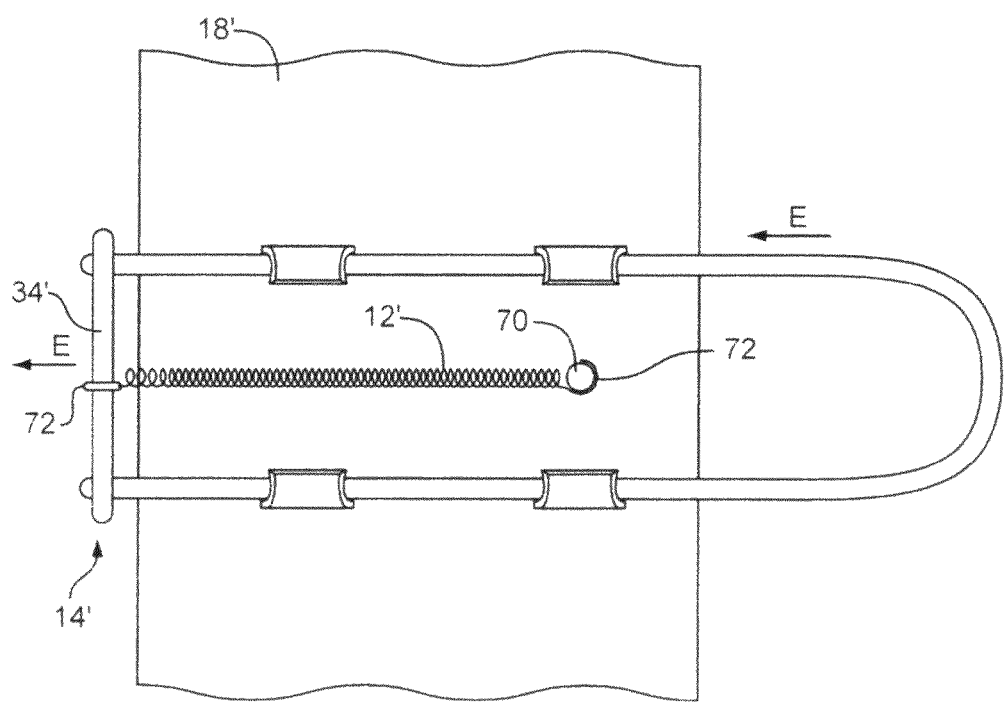
FIG. 9 is a rear-view schematic illustration of an alternative spring mechanism for a container holder according to the invention.

Referring to FIG. 9, an alternative manner in which a movable prong 14' may be mounted to a back plate 18' within the scope of the invention is illustrated. In this embodiment, a variable-force spring 12' is employed in place of substantially constant-force spring 12. In the illustrated example, variable-force spring 12' is a helical spring that is connected to movable prong 14' at spring post 34' and to back plate 18' at spring post 70 by spring hooks 72. A helical spring in tension typically provides a variable tensile force that increases as the spring is extended beyond its relaxed length. For example, the tensile force is often approximated as being directly proportional to the difference between the extended and relaxed lengths. However, container holders incorporating such springs are within the scope of the present invention, to the extent that they provide a preferred range of clamping forces over a useful range of gap widths between their gripping members. It should also be noted that, even when employing a variable-force spring, the effect of force variation can be minimized by "preloading" the spring to an initial tension that is much greater than the variation in tension due to spring extension resulting from normal use, so that the variation in tension is rendered relatively insignificant. Thus, a preloaded variable-force spring could be advantageously employed in the present invention in place of a substantially constant-force spring.

While the invention has been described with respect to certain preferred embodiments, as will be appreciated by those skilled in the art, it is to be understood that the invention is capable of numerous changes, modifications and rearrangements, and such changes, modifications and rearrangements are intended to be covered by the following claims.

What is claimed is:

1. An adjustable container holder comprising:
   a support;
   two at least substantially parallel, spaced apart, elongate, and generally straight prongs configured to hold a plurality of nested containers between the two prongs, the two prongs being mounted to the support for movement relative to each other and at least one prong moveable relative to the support to adjust the spacing between the prongs while maintaining the generally opposed orientation of the prongs; and
   a spring operatively connected to at least one of the prongs and configured to provide a force to urge that prong towards the other prong and to cause the prongs to exert a clamping force when a container is located between the prongs to hold the container between the prongs, the prongs configured to permit sliding movement of the outermost one of the nested containers located between the prongs toward free ends of the prongs and to remove the container from the adjustable container holder while maintaining the spacing between the prongs at least substantially constant.

2. The holder of claim 1, wherein the clamping force is large enough to retain a plurality of nested corrugated paperboard clamshell single-serving sandwich containers.

3. The holder of claim 2 wherein the clamping force is small enough to avoid undesirably deforming the containers when the spacing between the prongs is from about 2.5 inches to about 6 inches.

4. The holder of claim 1, wherein the clamping force is from about 0.1 pounds to about 1.5 pounds when the spacing between the prongs is from about 2.5 inches to about 6 inches.

5. The holder of claim 1, wherein the support is adapted to be held in place so that the prongs extend generally horizontally.

6. The holder of claim 5, wherein the support is adapted to be held in place so that the spacing between the prongs is generally horizontal.

7. The holder of claim 5, wherein the support is adapted to be held in a generally vertical position.

8. The holder of claim 1, wherein one of the prongs is fixedly mounted to the support and the other prong is mounted for movement relative to the support.

9. The holder of claim 1, further comprising a plurality of nestable containers contained between the prongs in a nested configuration; the nested containers stacked in a direction parallel to the prongs.

10. The holder of claim 1, wherein both of the prongs are mounted for movement relative to the support.

11. The holder of claim 1, the space around the free ends of the prongs being substantially free of obstruction to permit removal of a clam shell sandwich box container retained between the prongs at a hinged portion of the container, the container comprising two substantially square halves of side length approximately equal to the spacing between the prongs when the container is retained between the prongs, the square halves extending from the hinged portion in opposite directions perpendicular to the spacing between the prongs.

12. The holder of claim 1, each prong comprising a pair of cylindrical rods including a thicker rod and a thinner rod, the thinner rod disposed inward of the thicker rod to frictionally engage a tapered portion of a container that mates with each prong when a container is retained between the prongs.

13. An adjustable container holder comprising:
   a support;
   two generally parallel, spaced apart, elongate, and generally straight prongs mounted to the support for movement relative to each other and at least one prong moveable relative to the support to adjust the spacing between the prongs while maintaining the generally opposed orientation of the prongs; and
   a spring operatively connected to at least one of the prongs and configured to provide a force to urge that prong towards the other prong and to cause the prongs to exert a clamping force when a container is located between the prongs to hold the container between the prongs, wherein the spring is a substantially constant force spring configured to provide a clamping force that remains substantially the same as the spacing between the prongs is adjusted.

14. The holder of claim 13, wherein the substantially constant force spring is a flat spiral spring.

15. An adjustable container holder comprising:

a support;

two generally parallel, spaced apart, elongate, and generally straight prongs mounted to the support for movement relative to each other and at least one prong moveable relative to the support to adjust the spacing between the prongs while maintaining the generally opposed orientation of the prongs; and a spring operatively connected to at least one of the prongs and configured to provide a force to urge that prong towards the other prong and to cause the prongs to exert a clamping force when a container is located between the prongs to hold the container between the prongs, wherein the spring is a variable-force spring that is preloaded to provide a substantially constant force over the range of movement of the prongs relative to each other.

16. An adjustable container holder comprising:

a support;

two generally parallel, spaced apart, elongate, and generally straight prongs mounted to the support for movement relative to each other and at least one prong moveable relative to the support to adjust the spacing between the prongs while maintaining the generally opposed orientation of the prongs; and a spring operatively connected to at least one of the prongs and configured to provide a force to urge that prong towards the other prong and to cause the prongs to exert a clamping force when a container is located between the prongs to hold the container between the prongs, wherein the clamping force is substantially constant over the full range of spacing between the prongs permitted by the movement relative to the support of at least the first prong.

17. An adjustable container holder comprising:

a support;

two generally parallel, spaced apart, elongate, and generally straight prongs mounted to the support for movement relative to each other and at least one prong moveable relative to the support to adjust the spacing between the prongs while maintaining the generally opposed orientation of the prongs; and a spring operatively connected to at least one of the prongs and configured to provide a force to urge that prong towards the other prong and to cause the prongs to exert a clamping force when a container is located between the prongs to hold the container between the prongs, wherein each of the prongs includes a detent adjacent a free end of the prong, the detent extending toward the other prong.

18. A method of holding and removing a container comprising providing an adjustable container holder including a support, two at least substantially parallel, spaced apart, elongate, and generally straight prongs configured to hold a plurality of nested containers between the two prongs, the two prongs being mounted to the support, the prongs being mounted for movement relative to each other and at least one prong moveable relative to the support to adjust the spacing between the prongs while maintaining the generally opposed orientation of the prongs, and a spring operatively connected to one of the prongs and configured to provide a force to urge that prong towards the other prong;

moving the prongs apart from each other to a sufficient spacing to permit a container to be located between the prongs;

locating the container between the prongs;

releasing the prongs to permit the spring force to urge the prongs closer to each other and to clamp the container between the prongs; and sliding the outermost one of the nested containers located between the prongs toward free ends of the prongs and to remove the container from the adjustable container holder while maintaining the spacing between the prongs at least substantially constant.

19. The method of claim 18, wherein the locating the container comprises locating a plurality of nested containers between the prongs, the nested containers stacked in a direction parallel to the prongs.

20. The method of claim 19, further comprising grasping a selected container from the plurality of nested containers and sliding the container toward free ends of the prongs to separate the container from an adjacent nested container and to remove the container from the adjustable container holder.

21. The method of claim 18, wherein the locating the container comprises locating a clam shell sandwich box container between the prongs so that each opposite end of a hinged portion of the container is proximate one of the prongs, and the releasing the prongs clamps the hinged portion of the container between the prongs at its opposite ends.

22. The method of claim 18, wherein the releasing the prongs applies a clamping force of from about 0.1 pounds to about 1.5 pounds to the container.

23. The method of claim 18, wherein the spring is a substantially constant force spring configured to provide a clamping force that remains substantially the same as the spacing between the prongs is adjusted.

24. The method of claim 23, wherein the substantially constant force spring is a flat spiral spring.

25. The method of claim 18, wherein the spring is a variable-force spring that is preloaded to provide a substantially constant force over the range of movement of the prongs relative to each other.

26. The method of claim 18, wherein the clamping force is substantially constant over the full range of spacing between the prongs permitted by the movement relative to the support of at least the first prong.

* * * * *

UNITED STATES PATENT AND TRADEMARK OFFICE
Certificate

Patent No. 8,251,327 B2                                                                                       Patented: August 28, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: James C. Purgatorio, Woodridge, IL (US); Henry T. Ewald, Roselle, IL (US); Paul G. Simmons, Glen Ellyn, IL (US); David W. Kirby, Lemont, IL (US); Peter Rivera-Pierola, Chicago, IL (US); and Thomas Tapper, Schenectady, NY (US).

Signed and Sealed this Seventh Day of January 2014.

TERRELL MCKINNON
Supervisory Patent Examiner
Art Unit 3632
Technology Center 3600